United States Patent [19]

Berkowitz

[11] Patent Number: 4,964,648
[45] Date of Patent: * Oct. 23, 1990

[54] ADAPTOR HANDLE WITH ADJUSTING MECHANISM

[76] Inventor: Gerald Berkowitz, 33 Highbury St., Prospect South, Australia

[*] Notice: The portion of the term of this patent subsequent to Oct. 10, 2006 has been disclaimed.

[21] Appl. No.: 394,641

[22] Filed: Aug. 16, 1989

Related U.S. Application Data

[63] Continuation-in-part of Ser. No. 265,484, Nov. 1, 1988.

[51] Int. Cl.[5] .............................................. B62B 3/00
[52] U.S. Cl. ............................... 280/304.5; 16/114 R; 269/228
[58] Field of Search .................. 280/304.5, 47.31, 304, 280/655, 288.4, 47.371; 269/228; 292/66, DIG. 49; 16/40, 41, 114 R; 24/490, 514

[56] References Cited

U.S. PATENT DOCUMENTS

| | | | |
|---|---|---|---|
| 2,519,138 | 11/1952 | Marler | 144/303 |
| 2,600,584 | 6/1952 | Snell | 77/63 |
| 2,816,775 | 12/1957 | Costello | 280/289 |
| 3,336,048 | 8/1967 | Papucki | 280/289 |
| 3,503,276 | 3/1970 | Vigot | 74/544 |
| 3,971,552 | 7/1976 | Mayfield | 269/228 |
| 4,056,268 | 11/1977 | Connor et al. | 273/118 R |
| 4,708,357 | 11/1987 | Soderman | 280/304.5 |

*Primary Examiner*—Charles A. Marmor
*Assistant Examiner*—Richard Camby
*Attorney, Agent, or Firm*—Stetina and Brunda

[57] ABSTRACT

An adaptor handle for use on wheeled vehicles having two spaced-apart handles for application of propulsion forces and steering formed by an elongate arm extensible between the spaced-apart handles of the wheeled vehicle which includes a clamp adjacent each end thereof to enable the adaptor handle to be rapidly coupled onto the spaced-apart handles and a single hand grip extending substantially from the center of the arm. The clamps are formed as over-center latches having an adjustable plate which allow the adaptor handle to be used on wheeled vehicles having differing sized handle grips. Additionally, one or more auxiliary hooks are provided to enable storage of desired items upon the adaptor handle during use.

7 Claims, 1 Drawing Sheet

U.S. Patent    Oct. 23, 1990    4,964,648
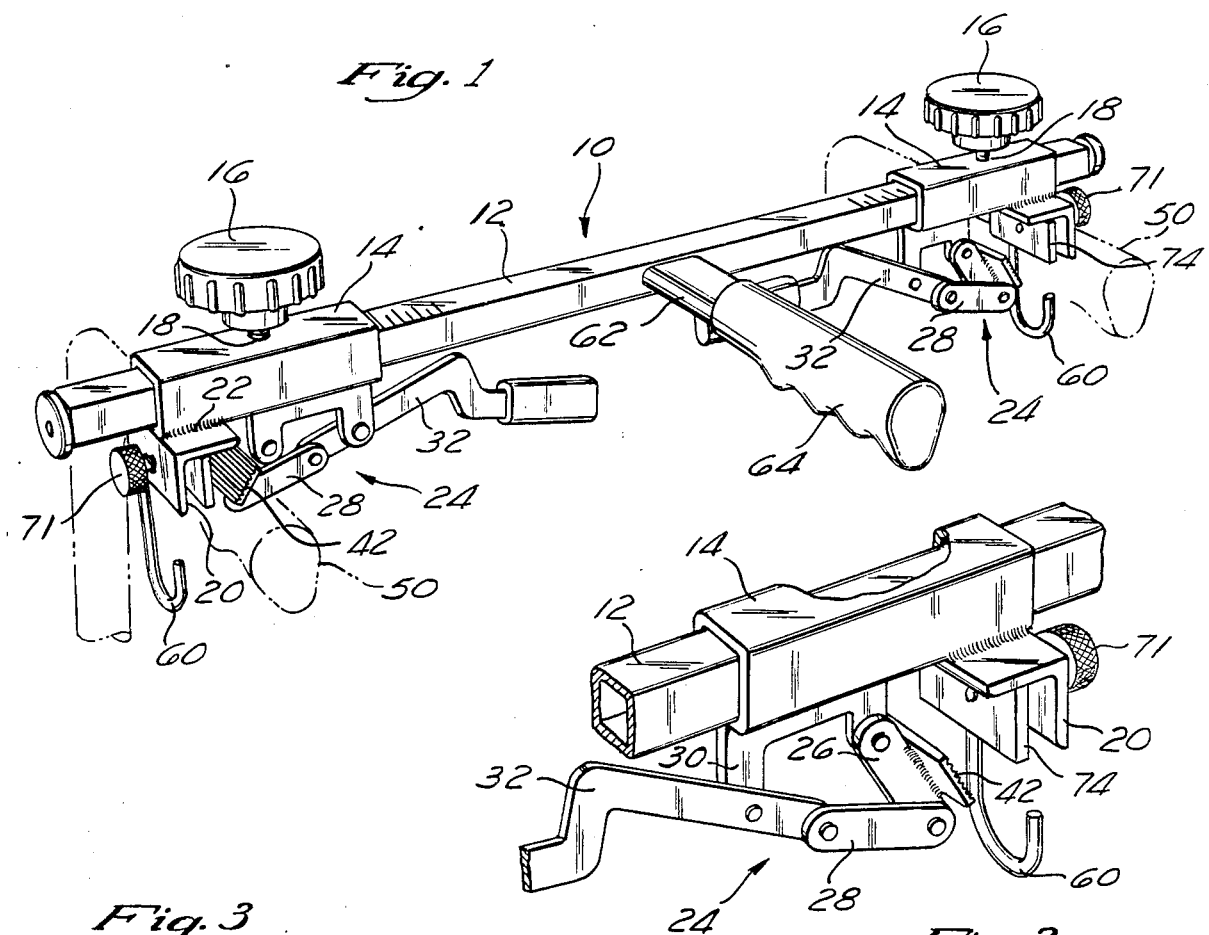
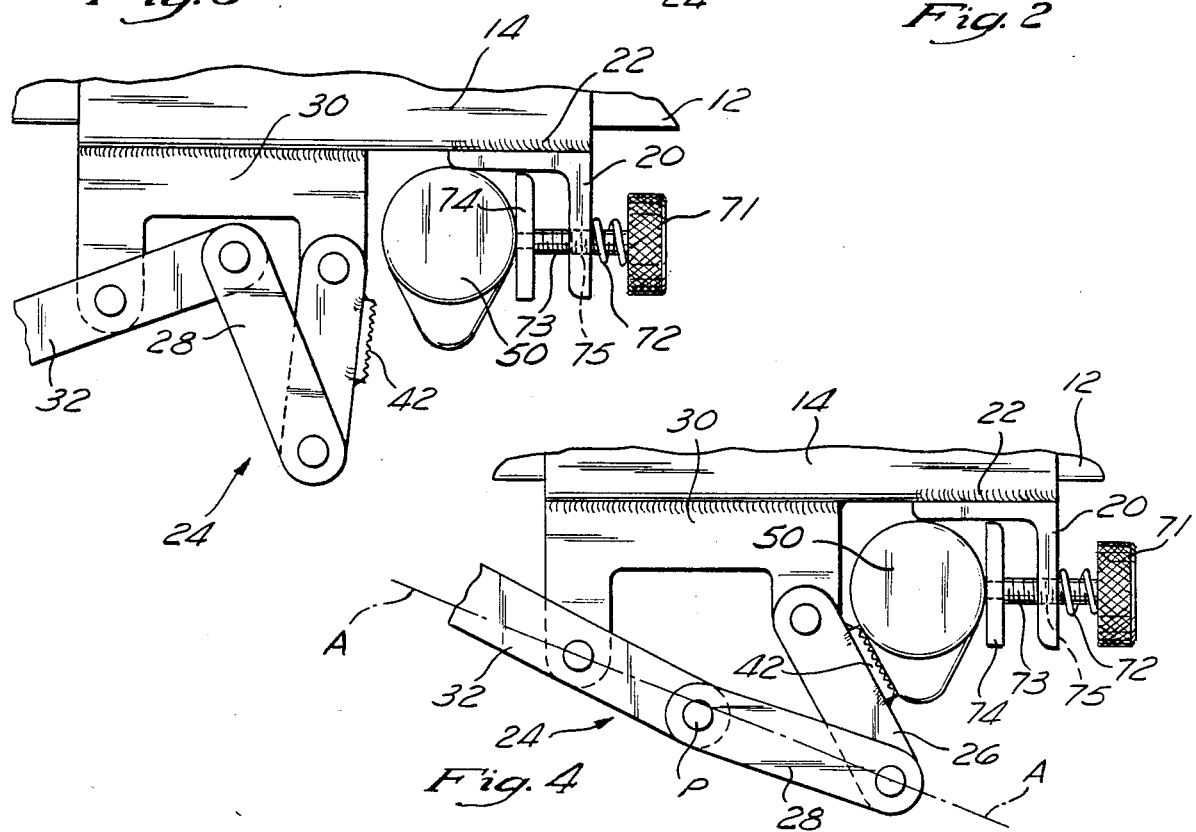

ADAPTOR HANDLE WITH ADJUSTING MECHANISM

RELATED APPLICATIONS

This is continuation-in-part application of parent application Ser. No. 07/265,484, filed Nov. 1, 1988, issued U.S. Pat. No. 4,872,697 Oct. 10, 1989, for inventor Gerard Berkowitz, and entitled ADAPTOR HANDLE.

FIELD OF THE INVENTION

The present invention relates generally to an adaptor handle for wheeled vehicles and more particularly to wheeled vehicles of the type propelled by hand, such as wheelchairs.

BACKGROUND OF THE INVENTION

Wheeled vehicles of the type to be considered with the present invention include wheelchairs, perambulators or baby carriages, supermarket trolleys, shopping carts, and the like, but the invention is not restricted to application to these devices and may be applied to general devices of the type discussed below. The type of wheeled vehicle particularly suited for the present invention comprises a wheeled vehicle having two spaced-apart handles extending from the vehicle adapted to enable the vehicle to be pushed along utilizing the handles to apply propulsion.

A problem exists, however, when a person has only one free hand to propel such a wheeled vehicle. In such instances, pushing on only one handle of the wheeled vehicle makes the vehicle very difficult to propel and particularly difficult to steer in confined areas, such as supermarket aisles and crowded streets where considerable damage could be caused by inadvertent mis-steering.

In recognizing the inherent deficiencies associated in the art, an adaptor handle was developed which extends between the pair of handles of a vehicle and allows a central hand grip to be utilized to readily propel and steer the vehicle with only one hand. This particular adaptor handle is disclosed and claimed in U.S. Letters Pat. No. 4,708,357, issued on Nov. 24, 1987 to Mavis Soderbaum, which Letters Patent has been assigned to the subject inventor. The Soderbaum adaptor handle, although comprising a substantial improvement in the art, has proven difficult to readily accommodate the differing size of handle grips utilized on conventional wheeled vehicle and wheelchair devices. As such there exists a need in the art for an improved adaptor handle which may be rapidly mounted upon a wheeled vehicle and further accommodates the multitude of differing sized handle grips utilized in conventional wheeled vehicles.

SUMMARY OF THE INVENTION

The present invention specifically addresses and alleviates the above-referenced deficiencies associated in the prior art by providing an adaptor handle for use on wheeled vehicles having two spaced-apart handles for application of propulsion forces and steering which is characterized by use of an elongate arm extensible between the spaced-apart handles of the wheeled vehicle. The elongate arm includes clamp means adjacent each end thereof to enable the adaptor handle to be rapidly coupled onto the spaced-apart handles as Well as a single grip extending substantially from the center of the arm. The clamp means are preferably formed as quick connect/disconnect over-center latches having a latch plate and an adjustable plate. The adjustable plate can be adjusted to accommodate wheeled vehicles having differing sized handles and handle grips. Additionally one or more auxiliary hooks are provided to enable storage of desired items upon the adaptor handle in a convenient manner.

The latch plates and adjustable plates are specifically designed to distribute the clamping force exerted by the adaptor handle over an enlarged surface are of the handle grips of the wheeled vehicle to prevent marring or permanent damage of the handle grips during use.

To install the adaptor handle of the present invention, both of the over-center latches are initially disposed in their open configuration and positioned about the handle grips of the wheeled vehicle. Depending upon the particular size of the handle grips on the wheeled vehicle, the adjustable plate may be adjusted in or out to provide a tight fit, and subsequently the over-center latches may be disposed in their closed or locked orientation thereby securing the adaptor handle to the wheeled vehicle. Subsequently, the elongate bar extending between the pair of latches may be reciprocated to a desired position wherein its central handle is disposed approximately midway between the latches and the elongate bar may then be rapidly locked in its desired position by way of a pair of tightening knobs. When desired to remove the adaptor handle from the wheeled vehicle, the over-center latches may be rapidly disposed in their open orientation whereby the entire adaptor handle may be rapidly removed from the wheeled vehicle and stored for reuse. The adjustable plates do not require readjustment prior to using the adaptor handle with the same or a like wheeled vehicle.

BRIEF DESCRIPTION OF THE DRAWINGS

These as well as other features of the present invention will become more apparent upon reference to the drawings wherein:

FIG. 1 comprises a perspective view of the adaptor handle of the present invention disposed upon a pair of handles of a wheeled vehicle;

FIG. 2 is a partial perspective view of one of the over-center latches, support carriage, and elongate bar utilized in the adaptor handle of the present invention;

FIG. 3 is an elevational view of the latching mechanism disposed in an open orientation; and FIG. 4 is an elevational view of the over-center latch disposed in a closed orientation.

DETAILED DESCRIPTION OF THE PREFERRED EMBODIMENT

Referring to the figures, the improved adaptor handle of the present invention, designated generally by the numeral 10, is depicted, which for purposes of illustration and not by way of limitation, is shown mounted to the handles or handle grips 50 of a conventional wheelchair. The adaptor handle 10 is composed generally of an elongate arm 12 which is preferably formed having a rectangular cross-sectional configuration which slidingly mounts a pair of carriages 14 thereupon. As shown, the carriages 14 are preferably formed from an elongate tubular member having an internal opening formed in a complementary configuration to the cross-sectional configuration of the arm 12 such that the carriages 14 may reciprocate axially along the length of the arm 12. Each of the carriages 14 include a handle wheel or knob 16 having a threaded shaft 18 extending axially outward from the lower surface thereof which is received within a threaded aperture formed in the upper surface of each carriage 14. As will be recognized, by manually tightening, i.e. threading, the hand wheel 16 in a clockwise direction, as viewed in FIG. 1, the threaded shafts 18 contact the upper surface of the arm 12 causing the carriages 14 to be locked in a desired axial position upon the arm 12.

The lower surface of the carriages 14 is additionally provided with a right angle elongate plate 20 which is rigidly connected thereto as by way of fillet welds 22.

An adjustable plate 74 is rotatably attached to the threaded shank 73 of a knurled control knob 71. The knurled control knob is received by a threaded aperture 75 formed in the right angle elongate plate 20. A spring 72 disposed about the threaded shank 73 between the right angle elongate plate 20 and the knurled knob 71 urges the threads of the threaded shank 73 into frictional engagement with the threads of the threaded aperture 75, thereby preventing unintentional loosening of the adjustment provided thereby.

An over-center latch, designated generally by the numeral 24, is additionally provided on the under surface of each carriage 14. As shown, the over-center latch 24 comprises a pair of linkages 26 and 28 which are pivotally interconnected at one end thereof. The opposite end of linkage 26 is additionally pivotally connected to a bracket 30 rigidly mounted to the lower surface of the carriage 14. The opposite end of the linkage 28 is pivotally connected to a latch handle 32 which is additionally pivotally connected to the bracket 30. As will be recognized, by pivotal movement of the handle 32, the linkage 26 moves away from and toWard the right angle member 20 from an open orientation, depicted in FIG. 3, to a closed orientation, depicted in FIG. 4. Additionally, as will be recognized, when disposed in the closed orientation depicted in FIG. 4, an over-center latching mechanism is provided since the pivot point P lies below the axis A-A formed between the linkages 26 and 28 and handle 32, as shown in FIG. 4.

Referring again to FIGS. 1 and 2, it will be seen that in the preferred embodiment, a substantially J-shaped hook 60 is additionally provided on the exterior surface of each of the right angle members 20 and depends downwardly therefrom. As will be recognized, such hooks 60 provide an auxiliary support surface which allows shopping bags, handbags, and/or tote bags to be attached thereto when the handle adaptor 10 is utilized. Additionally, as shown in FIG. 1, a handle 62 preferably having a hand grip 64 is rigidly attached to the central portion of the arm 12 and extends perpendicularly outward therefrom.

With the structure defined, the installation and use of the adaptor handle 10 of the present invention may be described. Initially, the adaptor handle 10 must be fitted to the particular wheeled vehicle to which it is desired to be applied. This initial fitting procedure is accommodated by disposing the latches 24 into their open configuration depicted in FIG. 3 by translating the latch handle 32 downwards. Additionally, both of the hand wheels or knobs 16 may be loosened to allow both carriages 14 to be freely reciprocal along the length of the arm 12. The knurled knobs 71 may be rotated counterclockwise, thereby translating adjustable plate 74 toward right angle elongate plate 20 such as to provide ample clearance for the handle grips 50 to be received by the latches 24. Subsequently, each of the carriages 14 may be disposed above the handles 50 of the wheeled vehicle whereby the inner surfaces of the latch plates 42 and the adjustable plate 74 tangentially contact the exterior of each of the handles or handle grips 50 of the wheeled vehicle. The knurled knob 71 is then turned clockwise so as to translate the adjustable plate 74 into secure engagement with the handle grips 50 of the wheeled vehicle.

Subsequently, each of the handles 32 of the latches 24 may be translated upward, causing the latches 24 to be disposed in their closed orientation, as depicted in FIG. 4, whereby the latch plates 42 contact the exterior surface of the handles 50 and tightly wedge the handle grips 50 between the latch plates 42 and the adjustable plates 74. As will be recognized, when disposed in this position, the latches 24 are in an over-center position which deters any inadvertent release of the adaptor handle 10 from the handle grips 50. The arm 12 may then be rapidly axially reciprocated relative the carriages 14 such that the handle 62 and handle grip 64 are disposed centrally between the carriages 14. Scales 80 aid in centering the arm 12 between the carriages 14. The hand wheels 16 may then be tightened to lock the carriages 14 along the length of the arm 12.

As will be recognized, with the adaptor handle 10 positioned upon the wheeled vehicle, propulsion and steering of the wheeled vehicle may be rapidly facilitated by a single hand being placed upon the hand grip 64. Further, auxiliary packages, handbags, or the like may be rapidly carried by the adaptor handle 10 merely by placing the same over the plural hooks 60 depending downwardly from the carriages 14.

When it is desired to remove the adaptor handle 10 from the wheeled vehicle, the latch handles 32 may be rapidly articulated to dispose the latches 24 in their open orientation and the entire adaptor handle 10 may be removed therefrom for storage. Subsequently, the adaptor handle 10 may be affixed to the same or a like wheeled vehicle merely by repositioning and articulating the latches 24 to a closed orientation. It may alternatively be installed upon a differing wheeled vehicle in the manner previously described.

Throughout this specification various material configurations have been defined herein, however, those skilled in the art will recognize that various modifications can be made to the same without departing from the spirit of the invention and such modifications are clearly contemplated herein.

What is claimed is:

1. An adaptor handle for wheeled vehicles and the like having a pair of rearwardly extending spaced-apart handles for application of propulsion forces and steering comprising:

an elongate arm member sized to extend across the pair of spaced-apart handles of the vehicle;

an over-center latch mounted adjacent opposite ends of said arm member for releasably clamping said arm member to said pair of handles of the vehicle;

a hand grip centrally mounted to said arm member and extending rearwardly therefrom adapted to be grasped in the hand of a user;

a plate member mounted adjacent said opposite ends of said arm member and cooperating with said over-center latch, said plate member including a knurled knob, having a threaded shank, extending through said plate member; and an adjustable plate rotatably attached to the threaded shank of said knurled knob.

2. The adaptor handle of claim 1 wherein said over-center latch is coupled to a carriage reciprocally mounted upon said arm member.

3. The adaptor handle of claim 2 further comprising means for releasably locking said carriage at a desired axial position along the length of said arm member.

4. The adaptor handle of claim 3 wherein said releasably locking means comprises a threaded hand wheel extensible through said carriage to contact said arm member.

5. The adaptor handle of claim 4 wherein said arm member and said carriage are formed having complementary cross-sectional configurations.

6. The adaptor handle of claim 5 wherein said plate is formed having a generally planar exterior surface sized to distribute the clamping force of said over-center latch throughout a sufficient area of said pair of handles to avoid any permanent deformation of said pair of handles.

7. The adaptor handle recited in claim 6 further comprising a spring disposed about the shank of said knurled knob for urging the threads of said knurled knob into frictional engagement with corresponding threads formed in said plate member thereby preventing unintentional loosening of said knurled knob.

* * * * *